Sept. 4, 1928.  
W. J. RANCOURT  
1,683,410
SKIN CLEANSING AND MASSAGING DEVICE
Filed Feb. 13, 1928
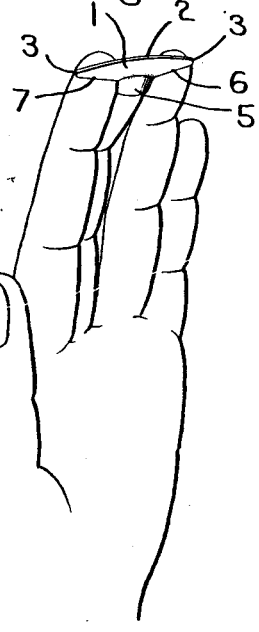
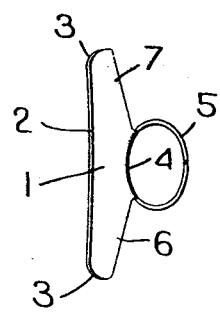
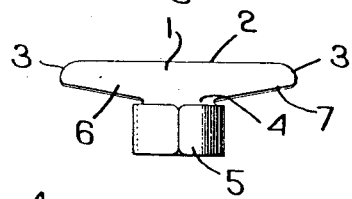
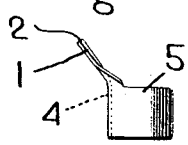
Inventor.  
Walter J. Rancourt  
by Heard Smith & Tennant.  
Attys.

Patented Sept. 4, 1928.

1,683,410

UNITED STATES PATENT OFFICE.

WALTER J. RANCOURT, OF BOSTON, MASSACHUSETTS.

SKIN CLEANSING AND MASSAGING DEVICE.

Application filed February 13, 1928. Serial No. 253,926.

This invention relates to devices for cleansing and massaging the skin.

Usual facial treatments, as well as treatments of the skin of other portions of the body, comprise the use of cold cream preparations including so-called skin foods, also the application to the skin of mud baths, etc. In such cases a substantial portion of the material applied to the skin is not absorbed and is usually removed by wiping or washing the same off. One of the beneficial advantages of such treatments comprises the loosening of blackheads and blemishes of the skin which are not removed by wiping or washing, with the consequent result that such blackheads and blemishes are more apparent after the treatment than before.

The present invention comprises a device having a specially formed blade which is adapted to remove, by a gentle scraping action, the unabsorbed material and simultaneously gently massaging the skin, thereby stimulating circulation in the tissues of and beneath the skin and consequently invigorating the skin.

A further object of the invention is to provide a device of this character which can be readily mounted upon the fingers of the hand and so manipulated by the fingers that a desired pressure can be applied to any portion of the blade.

A further object of the invention is to provide a device of this character having a blade so formed and constructed as may be used to remove such surplus material from recessed or projecting portions of the contour of the skin, such as those upon and along the sides of the nose and around the eyes.

A further object of the invention is to provide a device of this character having a thimble adapted to be applied to one of the intermediate fingers of the hand, such as the second finger, with laterally extending wings which may be engaged by other fingers upon opposite sides of the finger upon which the thimble is mounted, thus enabling either of the wings of the device to be pressed more firmly upon the skin than the other, or uniform pressure applied throughout the full length of the blade.

The device may also be used as a massaging device with the application to the skin of a suitable lubricant, or may be employed to remove thick coatings upon the skin such as are used in theatrical make-ups, etc.

These and other objects and features of the invention will more fully appear from the following description and the accompanying drawing and will be particularly pointed out in the claims.

In the drawing:

Fig. 1 is a perspective view showing a hand with a preferred form of the invention applied thereto and illustrating the manner in which it is engaged by the fingers of the hand;

Fig. 2 is a plan view of the device shown in Fig. 1;

Fig. 3 is a rear elevation of the device; and,

Fig. 4 is a side elevation thereof.

The preferred embodiment of the invention comprises a blade 1, which preferably is slightly arcuate throughout its length and preferably presents a flat central rounded scraping edge 2 merging into curved end portions 3 which also present rounded edges. The blade is provided with a preferably integral shank 4 extending from the central portion of the blade and bent into the form of a split thimble 5 adapted to be placed upon an intermediate finger of the hand. The device can thus be conveniently formed from sheet metal and the thimble by being thus split can be readily expanded or contracted to fit the finger of any hand.

The plane of the blade is inclined forwardly relatively to the longitudinal axis of the thimble to any desired degree, an inclination of from thirty to forty-five degrees being usually desirable.

The device thus constructed comprises a thimble adapted to fit upon an intermediate finger of the hand having a blade extending forwardly and laterally therefrom presenting wings, the back edges 6 and 7 of which are adapted to be engaged by other fingers upon opposite sides of the finger upon which the thimble is mounted, such as the first and third fingers, when the thimble is placed upon the second finger as illustrated in Fig. 1.

By reason of this construction a uniform pressure may be applied to the blade throughout its length, or greater or less pressure may be applied at either end of the blade by the first or third fingers as may be desired.

In the use of the device a substantially uniform pressure may be applied to the blade to remove the excess of cold cream or other cosmetic from the smooth portions of the skin. By pressing upon the blade with the first or third finger the end portion of the blade thus pressed may be caused to follow the contour of, and enter, a recess, thus removing the material therefrom. The rounded end portions of the blade also permit access to such portion of the face or body as the depression or recess along the side of the nose, and recesses around the eyes and along the walls of the ear, thus enabling the excess of material to be removed from any irregular surface of the face, or other portion of the body.

In the use of the device the rounded edge of the blade permits sufficient pressure to be applied to massage the skin gently, thus stimulating the circulation and invigorating the skin and the tissues therebeneath.

By reason of the ability thus to apply pressure to the edge of the blade, blackheads may be readily forced out and removed and loose dead skin and other blemishes readily and completely removed without irritation of the skin.

The excess of cold cream, skin food, or other material which has been applied to the skin can be much more rapidly removed by this device than by usual wiping or washing methods. The use of the device eliminates the necessity for employing soap, or other solvents, or detergents, which are likely to have an undesirable effect upon the skin, and the stimulation of the skin by the massaging attending the use of the device produces a pleasing reaction as well as a healthy glow.

The device desirably is made of rigid sheet metal, preferably silver composition. It, however, may be made of other metal including gold or metal plated with silver or gold, or of other suitable material, such as bakelite, celluloid, or other non-metallic compositions.

It will be understood that the particular embodiment of the invention disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. A skin cleansing and massaging device comprising a thimble, to fit upon intermediate finger of the hand, having a blade extending forwardly and laterally therefrom presenting a wing adapted to be engaged by another finger of the hand whereby the edge of the blade may be pressed firmly upon and moved over the skin.

2. A skin cleansing and massaging device comprising a thimble, to fit upon an intermediate finger of the hand, having a blade extending forwardly and laterally therefrom presenting oppositely extending wings adapted to be engaged by other fingers upon opposite sides of the finger upon which the thimble is mounted, whereby a desired pressure may be imposed upon the skin by any portion of the edge of the blade.

3. A skin cleansing and massaging device comprising a thimble, to fit upon an intermediate finger of the hand, a blade of slightly arcuate form extending forwardly and laterally therefrom presenting wings adapted to be engaged by other fingers upon opposite sides of the finger upon which the thimble is mounted and provided with rounded end portions, whereby a desired pressure may be imposed upon the skin by any portion of the edge of the blade and the ends of the blade pressed firmly into recesses or against projecting portions of the contour of the skin.

4. A skin cleansing and massaging device comprising a thimble, to fit upon an intermediate finger of the hand, a blade extending forwardly and laterally therefrom having a rounded skin-engaging edge, presenting wings adapted to be engaged by other fingers upon opposite sides of the finger upon which the thimble is mounted and provided with rounded end portions, whereby a desired pressure may be imposed upon the skin by any portion of the edge of the blade and the ends of the blade pressed firmly into recesses or against projecting portions of the contour of the skin.

5. A skin cleansing and massaging device comprising a thimble in the form of an open band having its edges in proximity to each other adapted to fit upon an intermediate finger of the hand, a blade integral therewith extending forwardly and laterally therefrom presenting oppositely extending wings adapted to be engaged by other fingers upon opposite sides of the finger upon which the thimble is mounted, whereby a desired pressure may be imposed upon the skin by any portion of the edge of the blade.

In testimony whereof, I have signed my name to this specification.

WALTER J. RANCOURT.